United States Patent
Dahlberg

[15] 3,687,355
[45] Aug. 29, 1972

[54] EGG CARTON

[72] Inventor: Kurg G. Dahlberg, Pittsford, N.Y. 14534

[73] Assignee: Thermo Trim Inc., Rochester, N.Y.

[22] Filed: Feb. 10, 1971

[21] Appl. No.: 114,231

[52] U.S. Cl. .................................229/45, 229/2.5
[51] Int. Cl. ..........................................B65d 85/32
[58] Field of Search ..............229/2.5, 45; 217/26.5

[56] References Cited

UNITED STATES PATENTS

| 2,888,183 | 5/1959 | Reifers | 229/2.5 |
| 3,416,695 | 12/1968 | Bessett | 217/26.5 X |
| 3,563,446 | 2/1971 | Lake | 229/2.5 |

*Primary Examiner*—Donald F. Norton
*Attorney*—George W. Shaw et al.

[57] ABSTRACT

A molded egg carton has egg-shaped sockets in the bottom half of the base and bracing walls forming square chambers above the sockets in the upper half of the base. This makes the base more rigid for better protection of the eggs and results in other advantages including more room for large eggs.

14 Claims, 5 Drawing Figures

Patented Aug. 29, 1972

INVENTOR.
KURT G. DAHLBERG

BY Cumpston, Shaw
and Stephens

ATTORNEYS

INVENTOR.
KURT G. DAHLBERG

BY Cumpston, Shaw
and Stephens

ATTORNEYS

EGG CARTON

THE INVENTIVE IMPROVEMENT

Designers of egg cartons have adhered fairly closely to egg-shaped sockets in the base, following the usual assumption that round eggs fit best in round holes. Such egg cartons as presently made suffer from general weakness and several other disadvantages, however. The invention includes a recognition of the weakness of present cartons and involves a realization of a way to make a stronger egg carton by forming square-topped chambers for the eggs. Squaring off the upper portion of a chamber for an egg runs counter to the teaching against inserting round objects in square holes, but it results in many substantial advantages in an egg carton. These include a far stronger base, greater egg protection and less breakage of eggs, less sticking of eggs in their sockets, more finger room for removing eggs from their sockets, better protection of eggs at the corners of the carton, and more secure latching of the cover over a more rigid base. The invention not only accomplishes these advantages in a substantially improved egg carton, but also aims at compatibility with existing machinery for handling egg cartons in the process of loading, latching, and packing.

SUMMARY OF THE INVENTION

The advantages of the invention apply to a molded egg carton that has a base for receiving eggs, a latch flap at the upper front of the base, and a cover at the upper back of the base. The bottom region of the base has a plurality of generally egg-shaped sockets deep enough to receive and support the lower ends of eggs with the tops of the sockets being generally circular and lying in a plane parallel with the top of the base in a region between the top and bottom of the base. Lateral walls in this plane extend outward from the socket tops to form generally square regions centered around the sockets with the sides of the square regions being aligned from front to back of the base. Front walls extend from the fronts of the forward square regions to the upper front of the base, and back walls extend from the backs of the rearward square regions to the upper back of the base. Substantially plane, bracing walls extend from the front walls to the back walls, and from the aligned sides of the square regions to the top of the base where pairs of bracing walls join in ridges, and divider walls extend up from the lateral walls between the backs of the forward square regions and the fronts of the rearward square regions. The general effect is relatively shallow, egg-shaped sockets with squared-off chambers above them to provide plane, bracing walls extending from front to back of the base and lateral walls in a mid plane between the top and bottom of the base for a much more rigid and sturdy base that better protects the eggs.

DRAWINGS

Figures 1, 2:
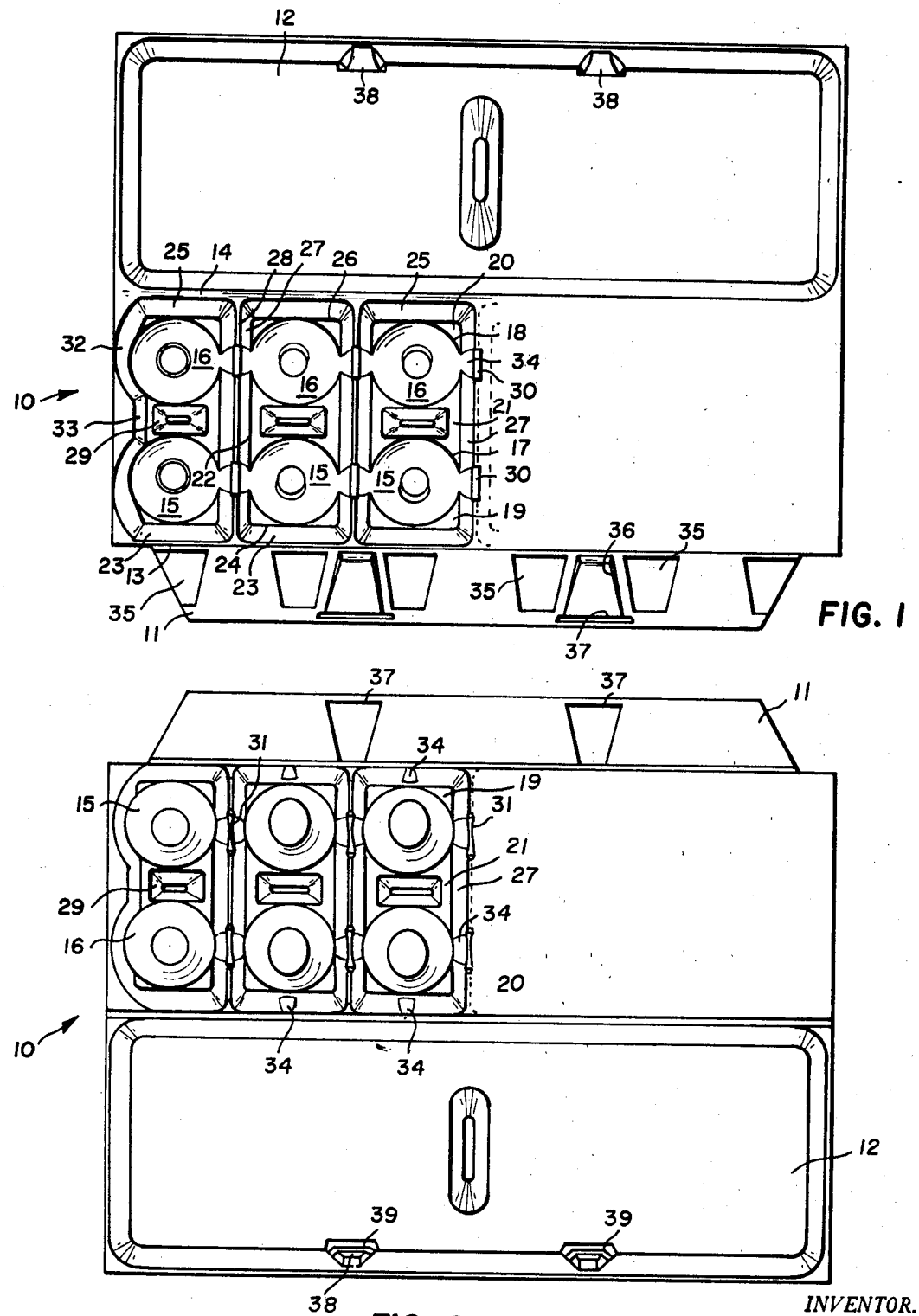
FIG. 1 is a bottom plan view of a preferred embodiment of the inventive egg carton in open condition.
FIG. 2 is a top plan view of the carton of FIG. 1 in open condition.
Figure 3:
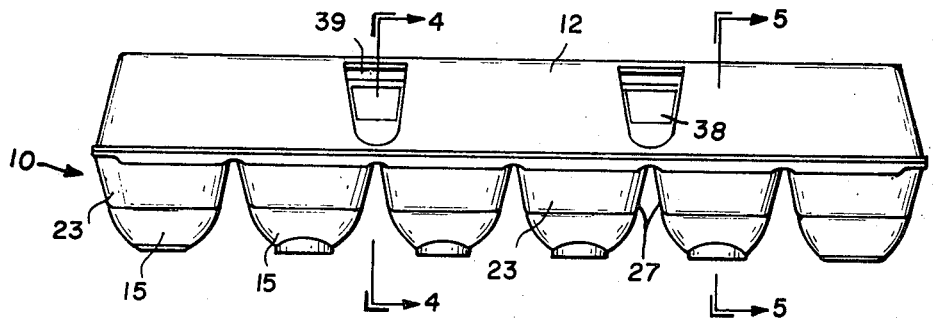
Figure 4:
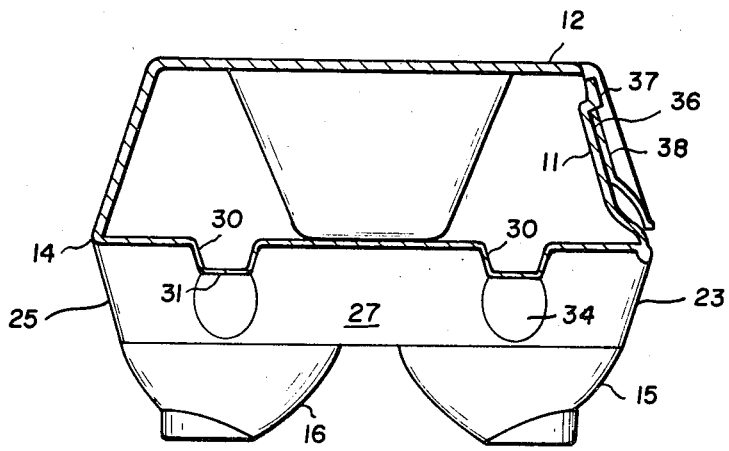
Figure 5:
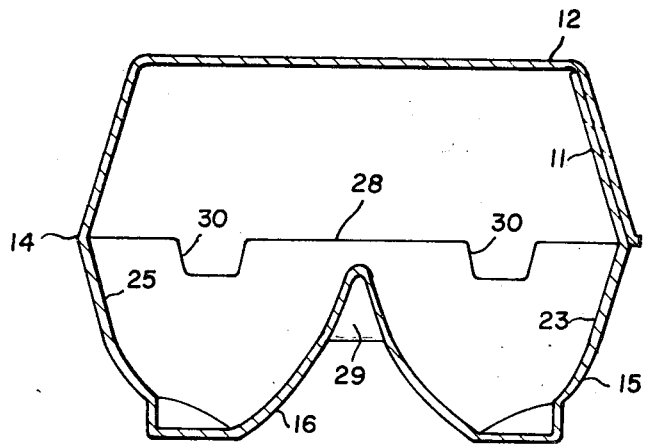

FIG. 3 is a front elevation of the carton of FIGS. 1 and 2 in closed condition; and FIGS. 4 and 5 are cross-sectional views of the carton of FIG. 3 taken respectively along the lines 4—4 and 5—5 thereof.

DETAILED DESCRIPTION

The illustrated preferred embodiment of the improved egg carton has a base 10 having a latch flap 11 hinged to the upper front of base 10 along a line of flexure 13, and cover 12 is hinged to the upper back of base 10 along a line of flexure 14. The carton is preferably molded in one piece in a generally known way.

The bottom region of base 10 is formed with a plurality of forward sockets 15 and rearward sockets 16 that are generally egg-shaped and deep enough to receive and support the lower ends of eggs placed in base 10. Respective socket tops 17 and 18 are generally circular and lie in a plane parallel with the top of base 10 and preferably midway between the top and bottom of base 10. This makes sockets 15 and 16 approximately one-half the depth of base 10 and this is preferred for locating and supporting eggs.

In the plane of socket tops 17 and 18, lateral walls 19 and 20 extend outward from respective socket tops 17 and 18 to form generally square regions centered around sockets 15 and 16. Lateral walls 19 and 20 join in a mid-region 21 to form a generally rectangular surface extending from front to back of base 10. The side edges 22 of square regions 19 and 20 are generally tangent to socket tops 17 and 18 and are aligned from front to back of base 10.

Substantially plane front walls 23 extend generally upright from the front edges 24 of square regions 19 to the line 13 at the upper front of base 10. Front walls 23 thus square off the upper fronts of chambers above sockets 15. Correspondingly, back walls 25 are also substantially plane and extend generally upright from the back edges 26 of square regions 20 to the line 14 at the upper back of base 10. Back walls 25 thus square off the upper backs of chambers above sockets 16.

Substantially plane, bracing walls 27 extend from front walls 23 to back walls 25 and join lateral walls 19 and 20 along aligned sides 22. Bracing walls 27 extend to the top of base 10 where pairs of bracing walls 27 join in ridges 28. Bracing walls 27 form strong straight struts extending substantially all the way from the upper front 13 to the upper back 14 of base 10 for sturdy cross-bracing of the carton, without any weakening curves or interruptions. Bracing walls 27 also square off the upper sides of chambers above sockets 15 and 16.

Divider walls 29 extend upward from the plane of lateral walls 19 and 20 between the backs of forward square regions 19 and the fronts of rearward square regions 20 to square off the adjacent regions above sockets 15 and 16. Divider walls 29 are preferably separated from bracing walls 27 to allow lateral walls 19 and 20 to join in mid-regions 21 as previously mentioned. Divider walls 29 keep eggs in adjacent sockets 15 and 16 from contacting each other, and they preferably extend to near the top of base 10.

Notches 30 are preferably formed in ridges 28 between adjacent sockets 15 and 16, and as shown in the bottom view of FIG. 2, walls 31 that form notches 30 extend between bracing walls 27 for cross-bracing between pairs of walls 27. Walls 31 contribute to longitudinal strength along the length of base 10.

The endmost pairs of sockets 15 and 16 preferably have their front walls 23 and back walls 25 joined by end walls 32 that curve inward in regions 33 adjacent divider walls 29 rather than extending straight across as bracing walls 27. This strengthens end walls 32 against longitudinal pressures applied to the ends of base 10.

The squared-off chambers above sockets 15 and 16 slightly increase the carrying capacity of base 10 over comparable egg cartons so that relatively larger eggs can be carried safely in base 10. Notches 30 in ridges 28 also contribute to this capacity. For extra large eggs, slight indentations are made in walls around the chambers above sockets 15 and 16 as best shown in FIG. 2. These include indentations 34 in bracing walls 27, front walls 23, and back walls 25, and indentations 35 in latch flap 11 adjacent front sockets 15, as shown in FIG. 1. Indentations 34 and 35 further increase the egg chamber size in the improved carton.

The more rigid base 10 also contributes to improved latching of the carton, and a preferred latch is shown in the drawings. This includes a walled recess 36 in latch flap 11 having an upper edge 37 near the free edge of flap 11 forming a latch bar. Cover 12 has correspondingly indented walls 38 leading up to apertures 39 near the top of cover 12. As the carton is closed, latch flap 11 is tucked inside cover 12, and as cover 12 is lowered, indented walls 38 move into flap recesses 36 until the lower edges of apertures 39 move under latch bars 37 with latch bars 37 entering into apertures 39 to latch the carton closed. Such latch is preferably made relatively high near the top of cover 12 for greater latching security. Improved rigidity of base 10 contributes to the strength and security of such latching.

The squared-off chambers above sockets 15 and 16 not only establish strong bracing walls 27 and lateral walls 19 and 20 for greatly improving the rigidity of base 10, but they provide greater clearance around eggs in sockets 15 and 16. This reduces the sticking of eggs in their sockets, and provides greater finger room for removing eggs from their sockets. It also makes the cartons easy to load and compatible with existing machinery for handling the cartons in loading, latching, and packing. The greater strength of base 10 results in less breakage of eggs in the cartons for better performance and greater efficiency.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the modifications and variations available within the spirit of the invention to adapt the improved egg carton to specific designs.

I claim:

1. In a molded egg carton having a base, a latch flap at the upper front of said base, and a cover at the upper back of said base, the improvement comprising:
   a. the bottom region of said base being formed as a plurality of generally egg-shaped sockets deep enough to receive and support the lower ends of eggs placed in said base;
   b. the tops of said sockets being generally circular and formed to lie in a plane parallel with the top of said base in a region between the top and bottom of said base;
   c. lateral walls in said plane extending outward from said socket tops to form generally square regions centered around said sockets;
   d. sides of said square regions being aligned from front to back of said base;
   e. substantially plane and generally upright front walls extending from the fronts of the forward ones of said square regions to said upper front of said base;
   f. substantially plane and generally upright back walls extending from the backs of the rearward ones of said square regions to said upper back of said base;
   g. substantially plane, bracing walls extending from said front walls to said back walls and from said aligned sides of said square regions to the region of the top of said base where pairs of said bracing walls join in ridges; and
   h. divider walls extending up from said lateral walls between the backs of said forward square regions and the fronts of said rearward square regions.

2. The carton of claim 1 wherein said lateral walls are formed to extend past said divider walls between said forward square regions and said rearward square regions.

3. The carton of claim 1 wherein the tops of said ridges are formed with notches centered between adjacent ones of said sockets.

4. The carton of claim 3 wherein connection walls forming said notches extend between said pairs of said bracing walls.

5. The carton of claim 1 wherein said plane of said lateral walls is about midway between said top and said bottom of said base.

6. The carton of claim 1 wherein said front walls and said back walls of the endmost of said square regions are joined by end walls extending from said lateral walls to the top of said base and formed to curve inward in the region of said divider walls.

7. The carton of claim 1 wherein said front walls, said back walls, said bracing walls, and said divider walls are all slightly indented to accommodate relatively large eggs.

8. The carton of claim 1 wherein said latch flap is formed with indentations disposed adjacent said sockets to accommodate relatively large eggs.

9. The carton of claim 1 wherein said latch flap has walled recesses with upper edges near the free edge of said flap for forming latch bars, said cover has inwardly indented walls leading to apertures near the top of said cover, and the upper edges of said indented walls are disposed to latch under said latch bars as said indented walls move into said flap recesses and said latch bars move into said apertures as said carton is closed.

10. The carton of claim 1 wherein said plane of said lateral walls is about midway between said top and said bottom of said base, and said lateral walls are formed to extend past said divider walls between said forward square regions and said rearward square regions.

11. The carton of claim 10 wherein the tops of said ridges are formed with notches centered between adjacent ones of said sockets, and connection walls forming said notches extend between said pairs of said bracing walls.

12. The carton of claim 11 wherein said front walls and said back walls of the endmost of said square regions are joined by end walls extending from said lateral walls to said top of said base and formed to curve inward in the region of said divider walls.

13. The carton of claim 12 wherein said latch flap has walled recesses with upper edges near the free edge of said flap for forming latch bars, said cover has inwardly indented walls leading to apertures near the top of said cover, and the upper edges of said indented walls are disposed to latch under said latch bars as said indented walls move into said flap recesses and said latch bars move into said apertures as said carton is closed.

14. The carton of claim 13 wherein said front walls, said back walls, said bracing walls, said divider walls, and said latch flap are all slightly indented to accommodate relatively large eggs.

* * * * *